(12) United States Patent
Chiu et al.

(10) Patent No.: US 7,051,271 B1
(45) Date of Patent: May 23, 2006

(54) METHOD, SYSTEM AND ARTICLE OF MANUFACTURE FOR LINKING A VIDEO TO A SCANNED DOCUMENT

(75) Inventors: Patrick Chiu, Menlo Park, CA (US); Jonathan T. Foote, Menlo Park, CA (US); Andreas Girgensohn, Menlo Park, CA (US); John S. Boreczky, San Leandro, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 902 days.

(21) Appl. No.: 09/584,205

(22) Filed: May 31, 2000

(51) Int. Cl.
*G06F 17/00* (2006.01)
(52) U.S. Cl. .................... 715/500.1; 715/513
(58) Field of Classification Search ............. 715/501.1, 715/513, 523, 512, 541, 500.1; 382/250, 382/298; 358/498; 708/402
See application file for complete search history.

(56) References Cited

U.S. PATENT DOCUMENTS

| | | | | |
|---|---|---|---|---|
| 5,181,255 | A * | 1/1993 | Bloomberg | 382/176 |
| 5,692,073 | A | 11/1997 | Cass | 382/219 |
| 5,822,537 | A * | 10/1998 | Katseff et al. | 709/231 |
| 5,835,129 | A * | 11/1998 | Kumar | 348/14.09 |
| 5,963,966 | A * | 10/1999 | Mitchell et al. | 715/513 |
| 5,986,655 | A | 11/1999 | Chiu et al. | 345/349 |
| 6,173,317 | B1 * | 1/2001 | Chaddha et al. | 709/219 |
| 6,230,172 | B1 * | 5/2001 | Purnaveja et al. | 715/512 |
| 6,456,732 | B1 * | 9/2002 | Kimbell et al. | 382/112 |

OTHER PUBLICATIONS

Ashley, J., Flickner, M., Hafner, J., Lee, D., Niblack, W., Petkovic, D. The query by image content (QBIC) system. *Proceedings of SIGMOD '95*. ACM, New York, p. 475, 1995.

Chiu, P., Kapuskar, A. Reitmeier, S., and Wilcox, L. Meeting capture in a media enriched conference room. Proceedings of the Second International Workshop on Cooperative Buildings (CoBuild '99). Lecture Notes in Computer Science, vol. 1670, Springer-Verlag, pp. 79-88.

Chiu, P., Kapuskar, A. Reitmeier, S., and Wilcox, L. NoteLook: Taking notes in meetings with digital video and ink. *Proceedings of the ACM Multimedia '99 Conference*. ACM, New York, pp. 149-158.

(Continued)

*Primary Examiner*—Sanjiv Shah
(74) *Attorney, Agent, or Firm*—Fliesler Meyer LLP

(57) ABSTRACT

Video recordings of meetings and scanned paper documents are natural digital documents that come out of a meeting. These can be placed on the Internet for easy access, with links generated between them by matching scanned documents to a segment of the video referencing the scanned document. Furthermore, annotations made on the paper documents during the meeting can be extracted and used as indexes to the video. An orthonormal transform, such as a Digital Cosine Transform (DCT) is used to compare scanned documents to video frames.

14 Claims, 7 Drawing Sheets

OTHER PUBLICATIONS

Cruz, G., and Hill, R. Capturing and playing multimedia events with STREAMS. *Proceedings of the ACM Multimedia '94 Conference*. ACM, New York, pp. 193-200.

Flickner, M. et al. Query by image and video content: The QBIC system. *IEEE Computer* vol. 28, No. 5, Sep. 1995, pp. 23-32.

Girgensohn, A., Boreczky, J., Wilcox, J., Foote, J. Facilitating video access by visualizing automatic analysis. In *Human-Computer Interaction INTERACT '99*, IOS Press, pp. 205-212.

Girgensohn, A. and Foote, J. Video Classification Using Transform Coefficients. In Proceedings of the International Conference on Acoustics, Speech, and Signal Processing (Phoenix, AZ), vol. 6, pp. 3045-3048, 1999.

Harrison, B., Baecker, R.M. Designing video annotation and analysis systems, *Graphics Interface '92*. Morgan-Kaufmann, pp. 157-166.

He, L., Sanocki, E., Gupta, A. Grudin, J. Auto-summarization of audio-video presentations. *Proceedings of the ACM Multimedia '99 Confernce.* ACM, New York, pp. 489-498.

Ip, H. and Chan, S. Hypertext-assisted video indexing and content-based retrieval. *Proceedings of the Hypertext '97 Conference*. ACM, New York, pp. 232-233.

Isaacs, E.A., Morris, T., and Rodriguez, T.K. A forum for supporting interactive presentations to distributed audiences. *Proceedings of CSCW '94*. ACM, New York, pp. 405-416.

MacKay, W.E. EVA: An experimental video annotator for symbolic analysis of video data, *SIGCHI Bulletin*, 21(2), pp. 68-71. 1989, ACM Press.

Mukhopadhyay, S., Smith, B. Passive capture and structuring of lectures. *Proceedings of the ACM Multimedia '99 Conference.* ACM, New York, pp. 477-487.

Nelson, L., Ichimura, S., Pedersen, E.R., Adams, L. Palette: A paper interface for giving presentations *Proceedings of CHI '99*. ACM, New York, pp. 354-361.

Ponceleon, D., Srinivasan, S., Amir, A., Petkovic, D., Diklic, D. Key to effective video retrieval: Effective cataloging and browsing. *Proceedings of the ACM Multimedia '98 Conference.* ACM, New York, pp. 99-107.

Trigg, R. Computer support for transcribing recorded activity, *SIGCHI Bulletin*, 21(2), 72-74. 1989. ACM Press.

Weber, K., and Poon, A. Marquee: a tool for real-time video logging. *Proceedings of CHI '94*. ACM, New York, pp. 58-64.

U.S. Appl. No. 09/266,558, filed Mar. 11, 1999, Foote et al.

\* cited by examiner

METHOD, SYSTEM AND ARTICLE OF MANUFACTURE FOR LINKING A VIDEO TO A SCANNED DOCUMENT

RELATED APPLICATION

Other applications of particular interest to and commonly assigned with the present application include: U.S. Ser. No. 09/266,558 entitled METHOD AND APPARATUS FOR INTERACTIVE SIMILARITY SEARCHING, RETRIEVAL, AND BROWSING OF VIDEO filed Mar. 11, 1999 by Jonathan T. Foote, Lynn D. Wilcox and Andreas Girgensohn.

FIELD OF THE INVENTION

The present invention relates to obtaining information, and in particular linking types of information.

BACKGROUND

Events, such as meetings, may be recorded to save important information. Often, a video of the meeting may contain important information which may be retrieved by an individual who may not have been able to attend. During the meeting, a presenter or participant may have a paper handout in order to enhance their presentation. The discussion pertaining to a particular handout or slide may be a significant aspect of the meeting. A subsequent viewer of the video may wish to view only a segment of the video pertaining to a particular paper handout.

Paper handouts are widely used and individuals feel comfortable interacting with them during a meeting. Individuals can make notes and annotations on the handouts without consciously thinking about how to do it. This is not the case with most electronic documents and devices, especially for a gathering of meeting participants who may have not been trained in the technology. The reason is that during a meeting when people must pay attention and participate, only the simplest technologies having an unobtrusive form factor and an undemanding user interface are usable.

The Cornell Lecture Browser allows for a user to view a segment of a video pertaining to a digital document in a specified format. The Cornell Lecture Browser matches the specified digital document to a section of a videotaped event. However, in certain scenarios, a digital pre-formatted file of the paper handout may not be available in all events. A paper handout may be the only document available at the meeting. Further, creating a specified digital form of a paper handout may require special equipment or knowledge not available to a participant.

In contrast, a paper handout may be easily scanned to create a digital file. Scanning equipment is relatively inexpensive and easy to operate. Nevertheless, in scanning the paper handout and/or slide, a number of problems may be encountered which do not have to be overcome in using the Cornell Lecture Browser. First, the scanned document may have substantial margins which would hinder matching of the scanned paper handout to a segment of the video tape. Second, the scanned document may be slightly rotated during scanning resulting in a skewed scanned document which may hinder matching of the scanned document to a segment of the video. Third, the paper handout may be in monochrome while the video may be videotaped in color further hindering a match between the scanned document and a segment of the video. Fourth, the paper handout may be scanned with handwritten annotations further complicating the matching of the scanned document and a segment of the video.

Therefore, it is desirable to provide a method, system and article of manufacture containing software which links a scanned document to a segment of a video. The method, system and article of manufacture should allow for linking a scanned document having substantial margins and rotated during scanning. The method, system and article of manufacture should be able to link a monochrome scanned document to a color video, or vice versa.

SUMMARY OF INVENTION

According to an embodiment of the present invention, a method for linking a scanned document to a segment of a video is provided. The margins of a scanned document are removed and the document is scaled. The scanned document is transformed into a scanned document identifier. A video file having a plurality of video frames is then obtained. A plurality of video frames is transformed into a plurality of respective video frame identifiers. The scanned document identifier is then compared to the plurality of video frame identifiers. The scanned document is linked to a first video frame in the plurality of video frames responsive to the comparison step.

According to an embodiment of the present invention, the transforming the scanned document step includes using an orthonormal transform.

According to yet another embodiment of the present invention, the orthonormal transform is a discrete cosine transform.

According to still another embodiment of the present invention, the transforming step includes removing the least significant information.

According to another embodiment of the present invention, the transforming the plurality of video frames includes using an orthonormal transform, such as a discrete cosine transform.

According to another embodiment of the present invention, the comparing step includes comparing color information from the scanned document to color information from the plurality of video frames.

According to another embodiment of the present invention, the linking step includes linking the scanned document to a first and a second frame in the plurality of video frames.

According to another embodiment of the present invention, the scanned document includes handwritten annotations.

According to another embodiment of the present invention, an information system for linking a scanned document to a segment of a video is provided. The information system comprises a first processing device coupled to a persistent storage device. The persistent storage device stores linking software which creates a link between a scanned document file and a segment of a video file responsive to a comparison of the transformed scanned document and a transformed video frame.

According to another embodiment of the present invention, the information system further comprises a scanner coupled to the first processing device. The scanner creates the scanned document or digital file from a physical document.

According to another embodiment of the present invention, a camera is coupled to the first processing device and is used for recording the video file.

According to another embodiment of the present invention, a second processing device is coupled to the first processing device and is used for viewing the segment of the video responsive to a selection of the scanned document.

According to still another embodiment of the present invention, an article in manufacture including a computer-readable memory having a first software program for obtaining the scanned document is provided. The article in manufacture also includes a second software program for obtaining a video file and a third software program for linking the scanned document to a segment of the video file.

According to another embodiment of the present invention, a third software program includes an orthonormal transform and a scaling software program.

According to another embodiment of the present invention, the third software program includes a software program for removing the least significant information and removing margins of the scanned document.

According to another embodiment of the present invention, a fourth software program removes annotations from the scanned document.

DETAILED DESCRIPTION

Figure 1:
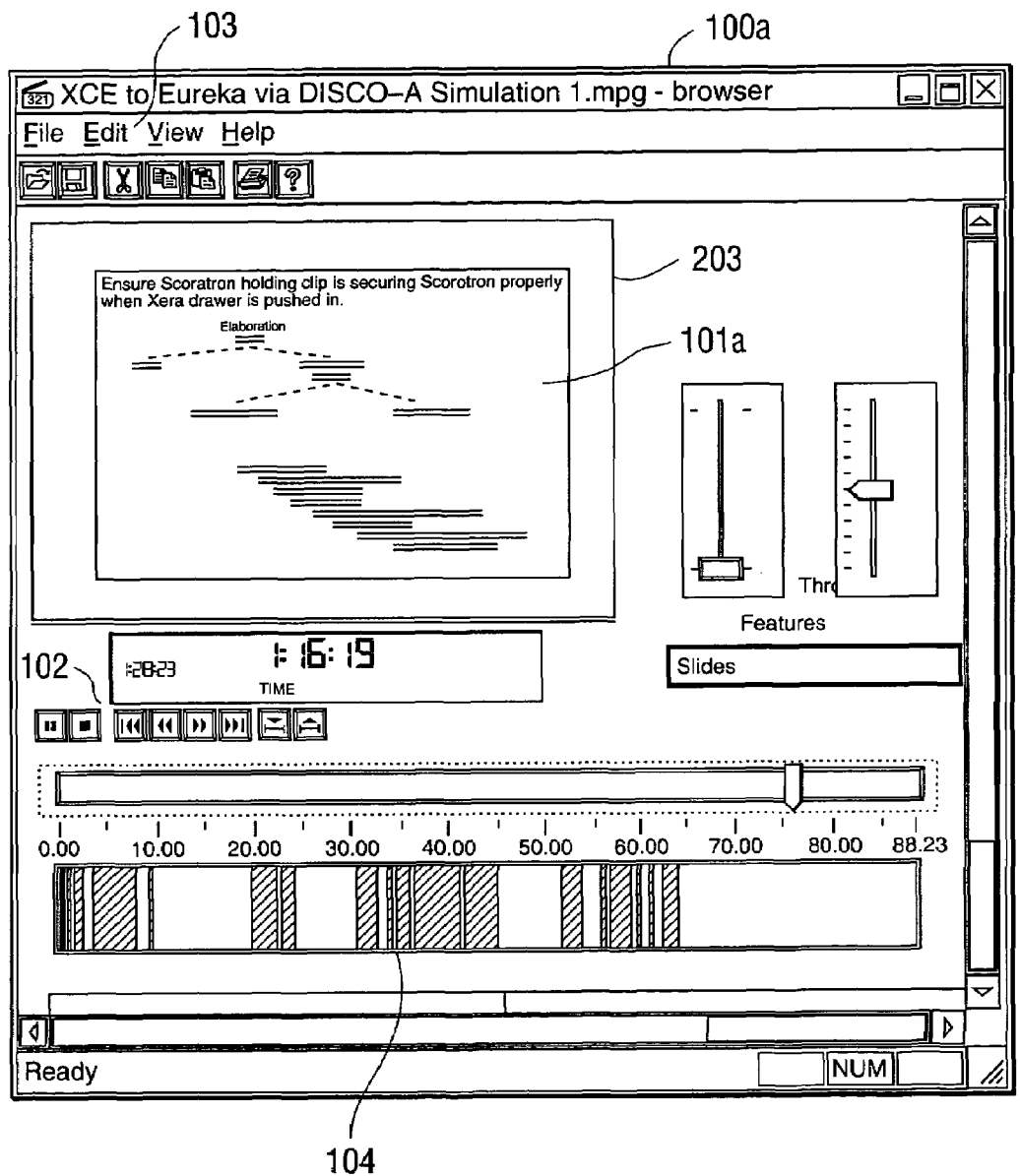
FIG. 1 illustrates a video frame displayed in a browser according to an embodiment of the present invention.
Figure 5:
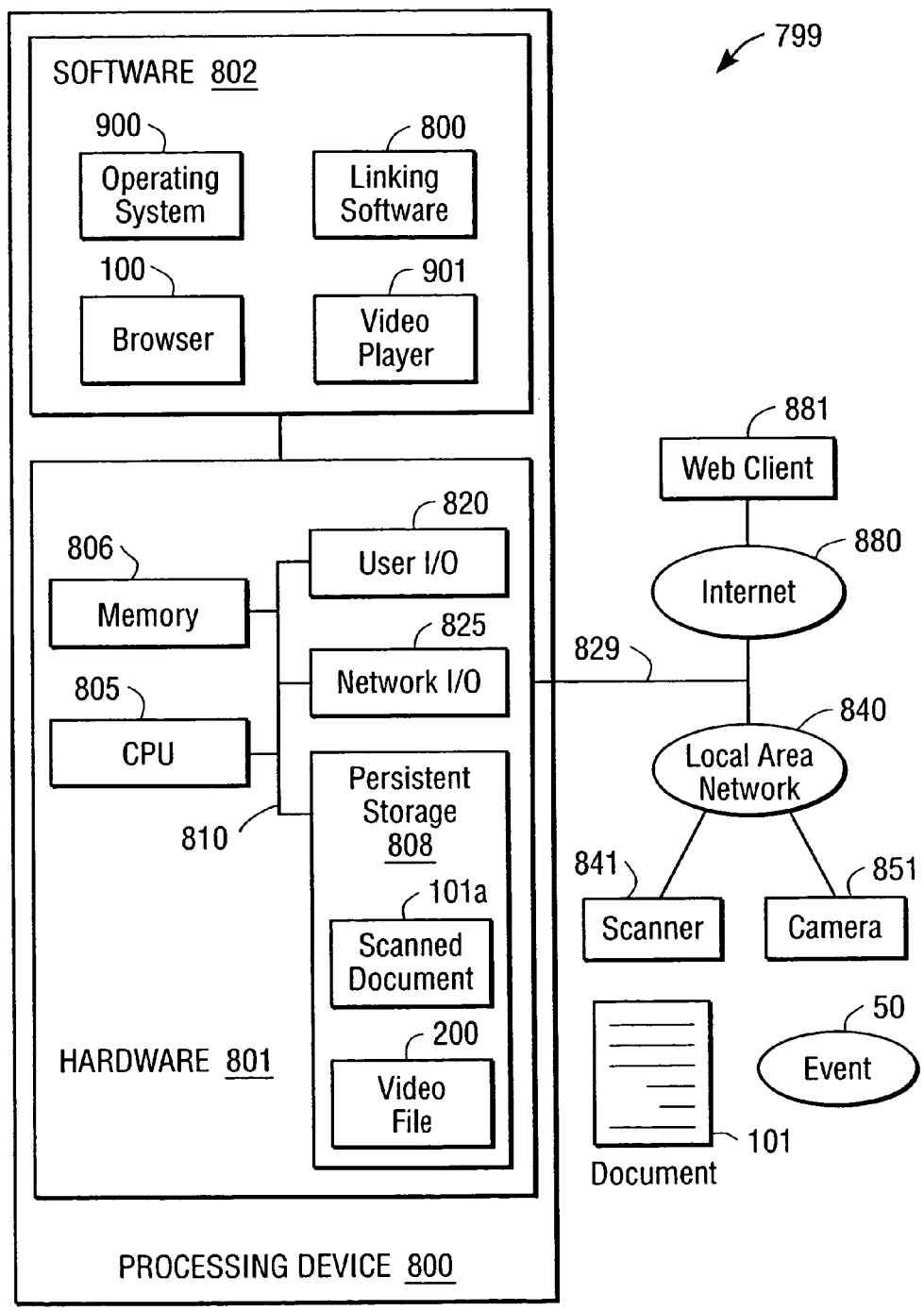
FIG. 5 illustrates a simplified hardware and software block diagram according to an embodiment of the present invention.

FIGS. 1 and 5 illustrate browser interface 100a for viewing a scanned document 101a used in a recorded event according to an embodiment of the present invention. As will be described in detail below, browser 100 and linking software 800 enables a user on the Internet 880 to view a segment of a recorded event 50, such as a meeting, which references scanned document 101a.

In an embodiment of the present invention, user interface 100a includes pull-down menus 103 which include File, Edit, View, and Help functions. Controls 102 allow for a user to control playing a video. In an embodiment of the present invention, controls 102 allow for user to control the playing of video file 200 which is a video recording of event 50 by camera 851 as illustrated in FIG. 5. Window 203 allows for the display of a scanned document and for the playing back of recorded event 50. Bar chart 104 illustrates the frequency and durations that a particular scanned document is used in event 50.

Figure 2:
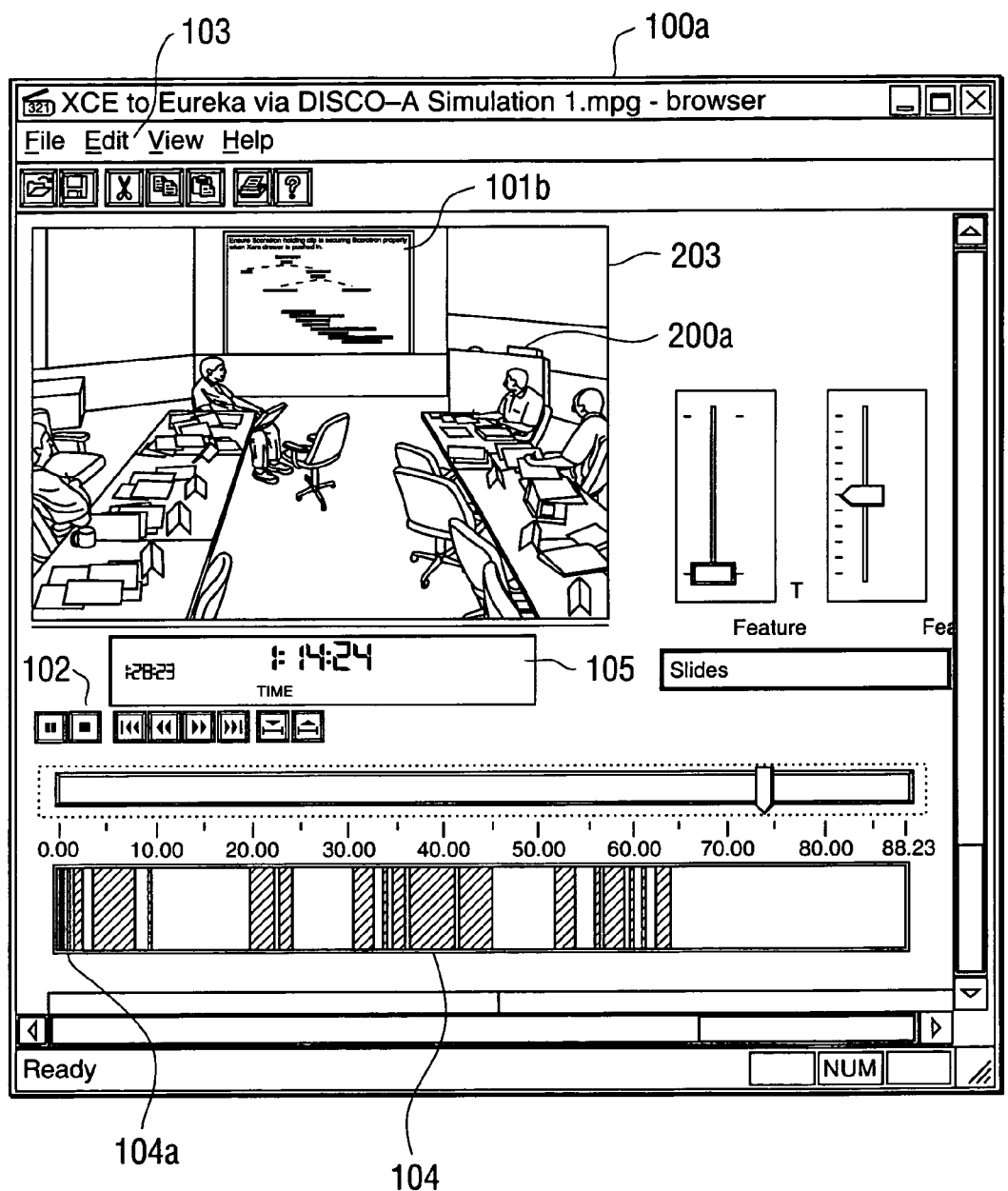
FIG. 2 illustrates a video of a meeting using the scanned document illustrated in FIG. 1 according to an embodiment of the present invention.

FIG. 2 illustrates browser interface 100a having window 203 used to display a video file 200, in particular, a video frame 200a of video file 200. In the video frame 200a, document projection 101b is recorded and shown in window 203. Window 105 displays the relative time in which video frame 200a is displayed during the course of event 50. Similarly, bar 104a represents the time and duration in which document 101 is presented as projection 101b in window 203.

Figure 3:
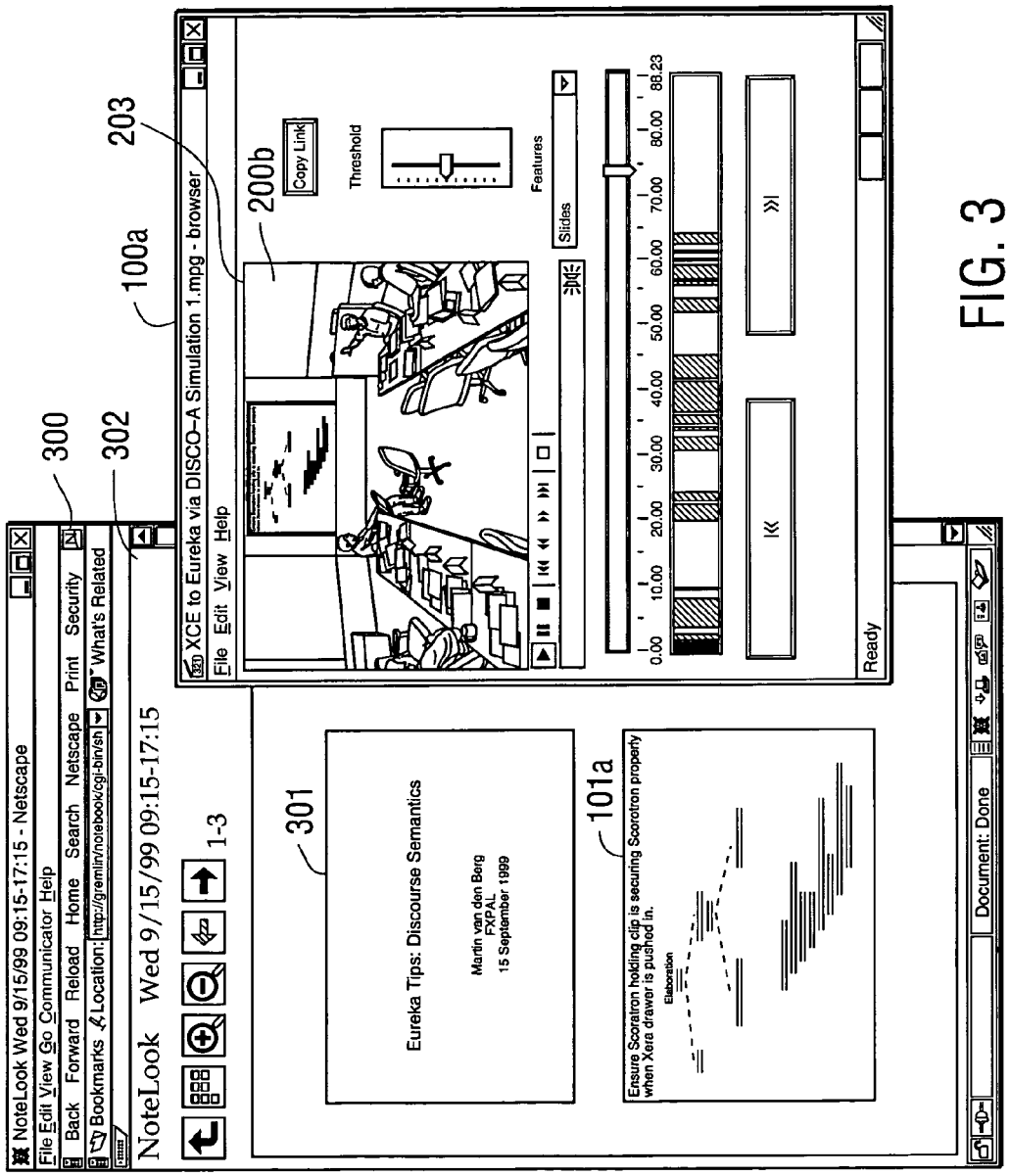
FIG. 3 illustrates viewing a scanned document referencing a segment of a video according to an embodiment of the present invention.

FIG. 3 illustrates browser interface 300 for accessing a segment of video file 200 which references scanned document 101a. Similar to FIG. 1, browser interface 300 includes window 302 for viewing scanned documents 301 and 101a. In an embodiment of the present invention, a user may double-click on the scanned document 301 or 101a and browser interface 100a will play in window 203 the corresponding recorded segment of event 50 referencing the scanned documents. In an alternate embodiment of the present invention, scanned documents 301 and 101a may be represented by hyperlinked universal resource location ("URL") addresses.

Linking software 800 as illustrated in FIG. 5 links a scanned document to a corresponding segment of video file in which the scanned document is referenced. Embodiments of the present invention allow for a user to view significant segments of a recorded event without having to view the entire recording. Thus, large amounts of time and resources may be saved by viewing only significant segments of event 50. Moreover, embodiments of the present invention allow for a user to use relatively inexpensive and user-friendly scanning equipment in linking the segment of the recording to the scanned document.

Figure 4A:
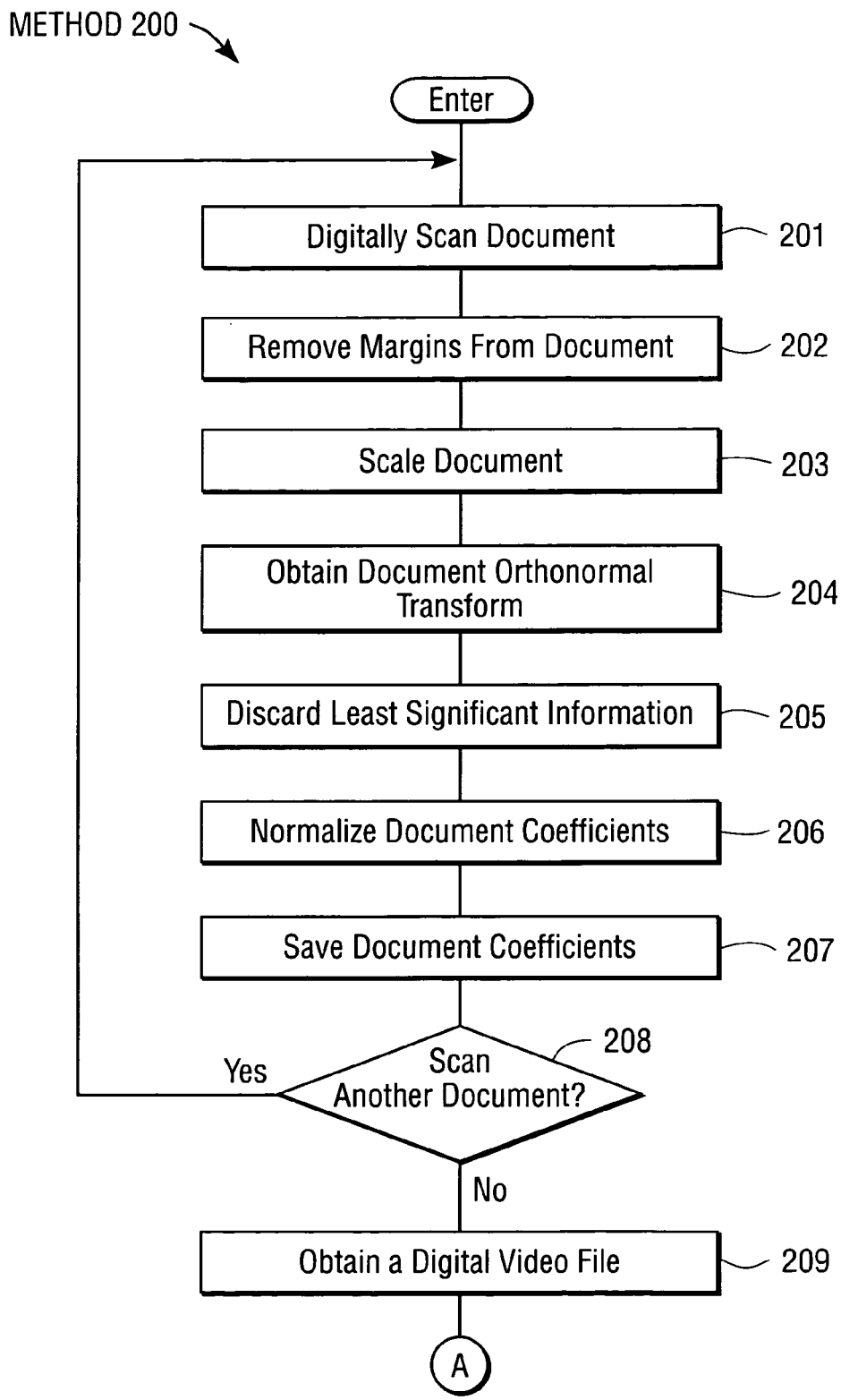
FIGS. 4a–c illustrate a method for linking a scanned document to a segment of a video according to an embodiment of the present invention.
Figure 4B:
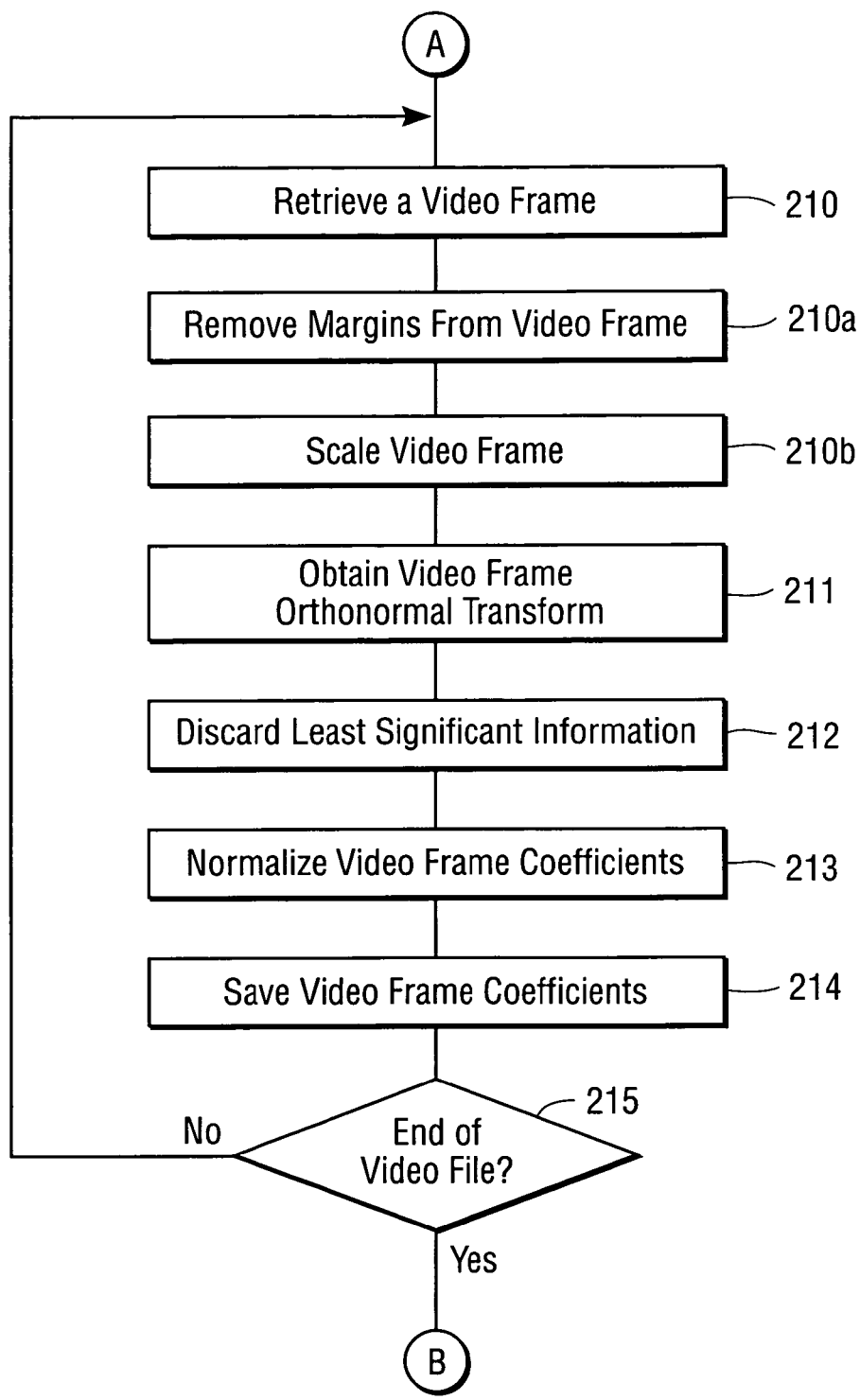
Figure 4C:
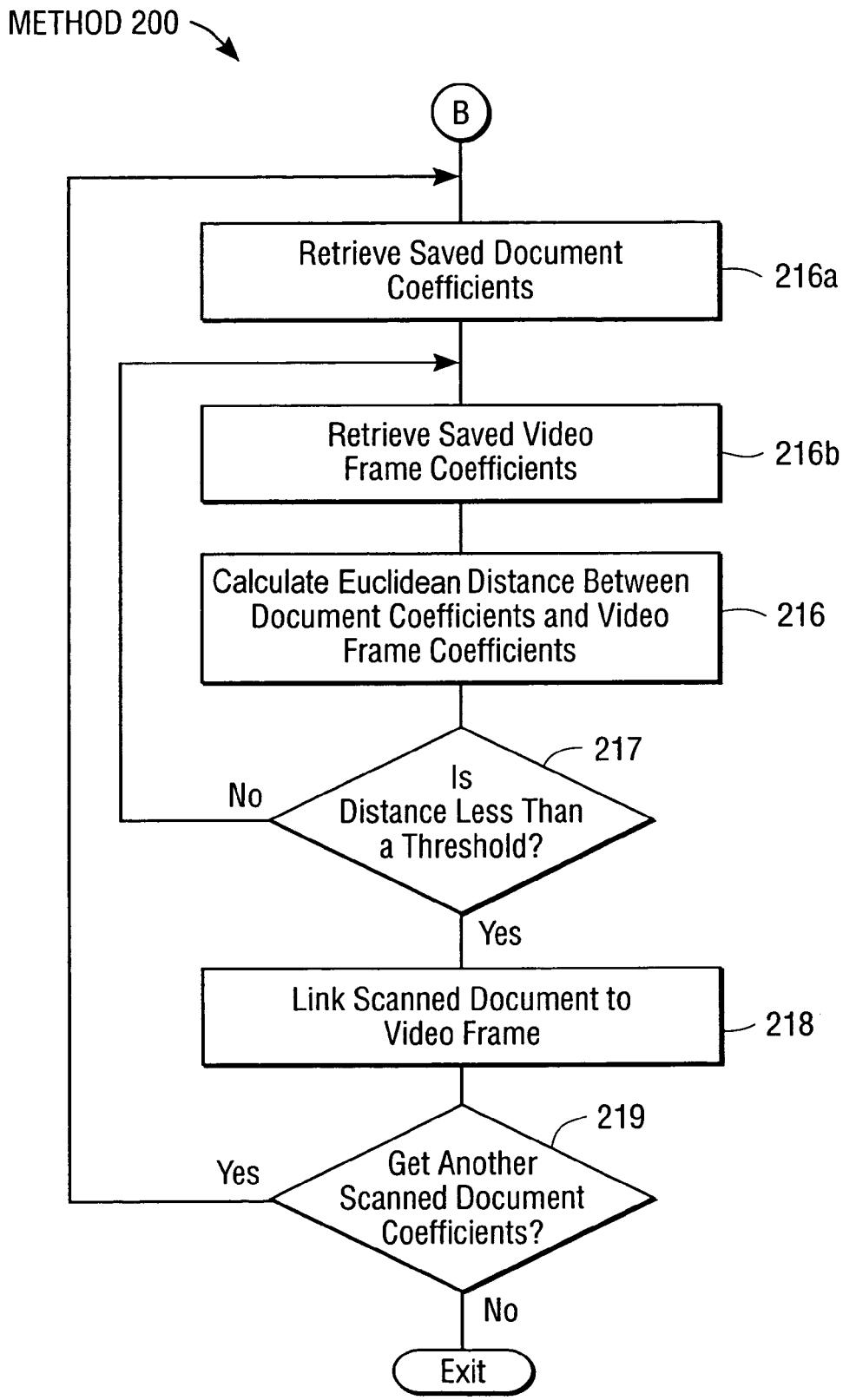

FIGS. 4a–c illustrate method 200 for linking a scanned document to a segment of a recorded event. As one who is skilled in the art would appreciate, FIGS. 4a–c illustrate logic blocks for performing specific functions. In alternate embodiments, more or fewer logic blocks may be used. In an embodiment of the present invention, logic blocks may represent software programs, software objects, software subroutines, code fragments, hardware operations, user operations, singly or in combination.

Method 200 initiates by digitally scanning a document 101, as illustrated by logic block 201, to create scanned document 101a or a digital representation of document 101. In an event, document 101 is a physical paper handout. In an alternate embodiment, document 101 has handwritten annotations or is a slide for a projection. The margins are then removed from the scanned document as illustrated by logic block 202. Black margins caused by scan converters and white margins in paper handouts have significant effects in transforming the document as described below. This problem is solved by reducing the bounding box of an image until all the margins having a uniform color are removed. It may be necessary to remove several layers of uniform margins in cases where a slide with a uniform, non-white background is printed on a white sheet of paper and compared to an image without any artificial margins.

The scanned document is then scaled as illustrated by logic block 203. In an embodiment of the present invention, the document is scaled to approximately 64×64 pixels.

An orthonormal transform is then performed on the document as illustrated by logic block 204. The transform is applied to the entire scanned document 101a rather than small sub-blocks as is common in image compression. In a preferred embodiment of the present invention, a discrete cosine transform (DCT) is performed on scanned document 101a to create a document identifier or a series of DCT coefficients.

The transform can be performed on grayscale images, or color information can be captured by calculating one or more additional signatures based on the color information. This is accomplished by computing an additional signature for the chromatic components of the scanned document (the UV components in the YUV color space) to add to the existing luminance (Y) signature. Because the chromatic components need less spatial resolution, they could be represented with smaller signatures.

Alternatively, each YUV or RGB color component could be treated as a separate image. Thus three signatures would be calculated and compared for each scanned document. This would allow weighting by overall color in the similarity metric.

Yet another embodiment of using color information is to combine obtaining a luminance (Y) signature with obtaining color histograms. In the first step, scanned images would be found by luminance signature similarity. The top-ranking scanned images could be examined using color-histogram similarity or a similar approach.

While color histograms are even less sensitive than DCT coefficients to image translation and rotation, they are not suitable as the only means for finding matches between a scanned document and a video file of the document. Two scanned documents with the same background and the same amount of text would produce the same color histograms even if the text is different. When using DCT coefficients, changes in the text distribution on the page can be recognized with a few low-frequency coefficients. For distinguishing different words of the same length in the same position, more high-frequency coefficients are needed. A proper balance between word-sensitivity and filtering out annotations is necessary. Nevertheless, color information or signatures may be used as a part of an image identifier.

The transformed data is then reduced by discarding the least significant information. In an embodiment, the scanned document coefficients are truncated as illustrated by logic block 205. In an embodiment, principal component analysis (PCA) or linear discriminant analysis (LDA) may be used to discard least significant information. In the preferred embodiment, selecting coefficients having the highest variation is preferred. In an embodiment of the present invention, the 256 lowest frequency DCT coefficients are kept using a low-pass filter. Truncated DCT coefficients are insensitive to small differences in image translation, rotation, or scale as can happen while scanning paper handouts.

The scanned document coefficients are then normalized as illustrated by logic block 206.

The document coefficients are then saved as illustrated by logic block 207.

A decision is then made whether or not there is a need to scan another document as illustrated by logic block 208. If another document needs to be scanned, logic blocks 201–207 are repeated. Otherwise, control transitions to logic block 209.

A digital video file is then obtained as illustrated by logic block 209. In an embodiment of the present invention, a camera 851 is positioned in a room in which a meeting is occurring so that the meeting may be recorded as video file 200. A video frame from video file 200 is then retrieved as illustrated by logic block 210. In an embodiment of the present invention, every sixth video frame is obtained.

The video from margins are removed as illustrated by logic block 210a and described above.

The video frame is then scaled as illustrated by logic block 210b and described above.

An orthonormal transform is then performed on the video frame, as illustrated by logic block 211, to provide a video frame identifier. In an embodiment of the present invention, the orthonormal transform is a discrete cosine transform as described above. The video frame coefficients are then truncated by logic block 212 and as described above. In an embodiment of the present invention, the 256 lowest frequency DCT coefficients are obtained.

The DCT coefficients are then normalized as illustrated by logic block 213.

The video frame coefficients are then saved as illustrated by logic block 214.

A determination is made whether there are any remaining video frames as illustrated by logic block 215. If there are remaining video frames, logic transitions back to logic block 210 and logic blocks 210–214 are repeated. Otherwise, logic control transitions to logic block 216a.

Saved document coefficients from a scanned document are retrieved as illustrated by logic block 216a.

Saved frame coefficients from a frame of the video are then retrieved as illustrated by logic block 216b.

A calculation is then performed between the retrieved DCT coefficients representing the scanned document 101a and the DCT coefficients of a video frame as illustrated by logic block 216. The similarity between any particular video frame and the scanned image can be calculated by measuring the similarity between the coefficients. In an embodiment of the present invention, a Euclidean distance between document coefficients and video frame coefficients is calculated. This measure can be usefully weighted to increase performance; for example the DC component can be weighted less so the method depends less on overall image brightness.

According to an embodiment of the present invention, a decision is made whether the Euclidean distance is less than a predetermined threshold as illustrated by logic block 217. If the distance is not less than the predetermined threshold, logic transitions back to logic block 216b. Otherwise, logic transitions to logic block 218.

According to another embodiment of the present invention, logic block 217 is replaced with determining a minimum number of Euclidean distances between document coefficients and video frame coefficients. For example, the five least Euclidean distances are used as matches.

The scanned digital document is then linked or indexed to the video frame as illustrated by logic block 218. A determination is made whether another scanned document coefficients are retrieved in logic block 219. If there is another scanned document, logic transitions to logic block 216a where logic blocks 216a–218 are repeated. Otherwise, the method exists.

A paper handout may be referenced multiple times in event 50. For example, during a question and answer period, the speaker may go back to a paper handout referred to in a question. To handle this, method 200, as described above, makes a complete pass through video file 200 (rather than stopping at the first match), and determines a sequence of appearances plus the duration of each appearance.

In the user interface, this information on the number of appearances and the duration of each appearance can be shown using "temporal icons." Temporal icons are clock icons showing a time representing the amount of time the paper handout was referenced. The icon also has a ring around the bezel (similar to a diver's watch) with an arc showing the duration of the appearance. Furthermore, the color of the arc and/or the clock face changes colors to indicate whether this segment of the event has been visited or partially visited during playback.

Paper handouts are very easy to annotate. The ink annotations can be ignored for the image matching described above. The reason is that ink strokes, being thin lines, will just fall through because they only contribute high frequency coefficients which are discarded.

To extract the ink annotations, a simple comparison between the original and the annotated paper handout may be performed. When more than one set of handouts have been annotated, these ink strokes may be extracted and selectively layered over the common background of the scanned document. Another way to display the ink annotations and notes is simply to show them without a background. In any case, the ink strokes may be hyperlinked to play their corresponding segment in the video recording.

FIG. 5 shows hardware and software components of an exemplary information system suitable for linking scanned documents to segments of recorded events, according to an embodiment of the present invention. System 799 of FIG. 5 includes a processing device 800 connected by one or more communication pathways, such as connection 829, to a local-area network (LAN) 840 and also to a wide-area network, here illustrated as the Internet 880. Through LAN 840, processing device 800 can communicate with other processing devices, such as scanner 841 and camera 851. In an alternate embodiment scanner 841 and camera 851 are not physically connected to LAN 840. Through the Internet 880, processing device 800 can communicate with other processing devices, both locally and remote, such as web client 881. As will be appreciated, the connection from processing device 800 to Internet 880 can be made in various ways, e.g., directly via connection 829 (wired or wireless), or through local-area network 840, or by modem (not shown).

Processing device 800 in an embodiment of the present invention is a personal or office computer. An exemplary embodiment uses a Dell® Dimension® XPS B Series desktop computer (Dell Computer Company, Round Rock, Tex.). In an alternate embodiment, processing device 800 is a personal digital assistant, hand-held computer, "Smart" telephone, information appliance, or an equivalent thereof. For purposes of exposition, processing device 800 can be conveniently divided into hardware components 801 and software components 802; however, persons of skill in the art will appreciate that this division is conceptual and somewhat arbitrary, and that the line between hardware and software is not a hard and fast one. Further, it will be appreciated that the line between a host computer and its attached peripherals is not a hard and fast one, and that in particular, components that are considered peripherals of some computers are considered integral parts of other computers.

Hardware components 801 include a processor (CPU) 805, memory 806, persistent storage 808, user I/O 820, and network interface 825. These components are well understood by those of skill in the art and, accordingly, need be explained only briefly here.

Processor 805 can be, for example, a microprocessor or a collection of microprocessors configured for multiprocessing. It will be appreciated that the role of processing device 800 can be taken in some embodiments by multiple computers acting together (distributed computation); in such embodiments, the functionality of processing device 800 in the system of FIG. 5 is taken on by the combination of these processing devices, and the processing capabilities of processor 805 are provided by the combined processors of the multiple computers.

Memory 806 can include a computer readable medium such as read-only memory (ROM), random-access memory (RAM), virtual memory, or other memory technologies, singly or in combination. Persistent storage 808 can include a computer readable medium, for example, a magnetic hard disk, a floppy disk, or other persistent read-write data storage technologies, singly or in combination. It can further include mass or archival storage, such as can be provided by CD-ROM or other large-capacity storage technology. (Note that web client 881 may be have a similar software and hardware components.) In an embodiment, persistent storage 808 stores a scanned digital document 101a and video file 200.

User I/O (input/output) hardware 820 typically includes a visual display monitor such as a CRT or flat-panel display, an alphanumeric keyboard, and a mouse or other pointing device, and optionally can further include a printer, an optical scanner, or other devices for user input and output. In an embodiment, user I/O 820 is used to select the playback of a segment of video file 200 corresponding to a scanned digital document 101a.

Network I/O hardware 825 provides an interface between processing device 800 and the outside world. More specifically, network I/O 825 lets processor 805 communicate via connection 829 with other processors and devices through LAN 840 and through the Internet 880.

Software components 802 include an operating system 900 and a set of tasks under control of operating system 900. As known by one of ordinary skill in the art, operating system 900 also allows processor 805 to control various devices such as persistent storage 808, user I/O 820, and network interface 825. Processor 805 executes the software of operating system 900 and its tasks in conjunction with memory 806 and other components of computer system 800.

In an embodiment, software 802 includes browser 100 and video player 901 for playing video file 200. In an embodiment, video player 901 is a Moving Picture Experts Group (MPEG) player or RealVideo player. In an embodiment of the present invention, browser 300 may be a Netscape 6.0 browser provided by Netscape Communications Corporation located in Mountain View, Calif.

In an embodiment of the present invention, linking software 808 is stored on a computer-readable medium such as a magnetic hard disk, floppy disk, CD-ROM, or other writeable data storage technologies, singly or in combination.

Persons of skill in the art will appreciate that the systems of FIG. 5 are intended to be illustrative, not restrictive, and that a wide variety of computational, communications, and information and document processing devices can be used in place of or in addition to what is shown in FIG. 5. For example, connections through the Internet 880 generally involve packet switching by intermediate router computers (not shown), and processing device 800 is likely to access any number of processing devices, including but by no means limited to scanner 841 and camera 851.

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents:

What is claimed is:

1. A method for linking a scanned document to a video, comprising the steps of:

(a) obtaining a scanned document having margins;

(b) removing the margins from the scanned document;

(c) scaling the scanned document;
(d) removing the least significant information from the scanned document;
(e) transforming the scanned document of step d into a scanned document identifier;
(f) obtaining a video file having a plurality of video frames;
(g) transforming the plurality of video frames into a plurality of respective video frame identifiers;
(h) comparing the scanned document identifier with the plurality of video frame identifiers; and
(i) linking the scanned document to a first video frame in the plurality of video frames.

2. The method of claim 1, wherein the obtaining a scanned document step includes the step of scanning a document.

3. The method of claim 1, wherein the removing the margins step includes reducing the boundary box of the scanned document until the margins having a uniform color is removed.

4. The method of claim 1, wherein the scaling step includes scaling the scanned document to approximately 64 pixels by approximately 64 pixels.

5. The method of claim 1, wherein the transforming the scanned document step includes using a orthonormal transform.

6. The method of claim 5, wherein the orthonormal transform is a discrete cosine transform.

7. The method of claim 1, wherein the obtaining a video file includes recording an event with a video recorder.

8. The method of claim 1, wherein the transforming the plurality of video frames step includes using a orthonormal transform.

9. The method of claim 8, wherein the orthonormal transform is a discrete cosine transform.

10. The method of claim 1, wherein the comparing step includes comparing color information from the scanned document and color information from the plurality of video frames.

11. The method of claim 1, wherein the linking step includes linking the scanned document to a first and a second frame in the plurality of frames.

12. The method of claim 1, wherein the scanned document includes handwritten annotations.

13. The method of the claim 12, further comprising the step of extracting the annotations from the scanned document.

14. The method of claim 1, further comprising the step of viewing a segment of the video by double-clicking a universal resource locator address of the scanned document.

* * * * *